United States Patent
Teetzel et al.

(10) Patent No.: US 12,495,853 B2
(45) Date of Patent: Dec. 16, 2025

(54) HEADGEAR SHROUD ASSEMBLY

(71) Applicant: WILCOX INDUSTRIES CORP., Newington, NH (US)

(72) Inventors: James W. Teetzel, Portsmouth, NH (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 0 days.

(21) Appl. No.: 18/418,496

(22) Filed: Jan. 22, 2024

(65) Prior Publication Data
US 2024/0407493 A1  Dec. 12, 2024

Related U.S. Application Data

(60) Provisional application No. 63/441,117, filed on Jan. 25, 2023.

(51) Int. Cl.
*A42B 3/04* (2006.01)

(52) U.S. Cl.
CPC .................. *A42B 3/0406* (2013.01)

(58) Field of Classification Search
CPC .................. A43B 3/04; A43B 3/0406
See application file for complete search history.

(56) References Cited

U.S. PATENT DOCUMENTS

| | | |
|---|---|---|
| 6,751,810 B1 | 6/2004 | Prendergast |
| 7,004,439 B1 | 2/2006 | Taylor et al. |
| 8,375,473 B2 * | 2/2013 | Celona ............ G02B 23/125 2/422 |
| 8,908,389 B2 * | 12/2014 | Teetzel ............ F41H 1/04 2/205 |
| 9,414,633 B2 * | 8/2016 | Giroux Bernier ..... A42B 3/221 |
| 9,507,245 B1 * | 11/2016 | Druker ............ F16M 13/02 |
| 9,622,529 B2 | 4/2017 | Teetzel et al. |
| 9,775,395 B2 | 10/2017 | Teetzel et al. |
| 10,028,544 B2 | 7/2018 | Teetzel |
| 10,264,840 B2 | 4/2019 | Teetzel et al. |
| 10,492,555 B2 * | 12/2019 | Lebel ............ A42B 3/042 |
| 10,542,787 B2 * | 1/2020 | Lebel ............ G02C 3/02 |
| 10,765,164 B2 * | 9/2020 | Giroux Bernier ..... A42B 3/00 |
| 10,939,718 B2 | 3/2021 | Teetzel et al. |

(Continued)

OTHER PUBLICATIONS

"*New* Unity Tactical SUMMIT 3-Hole Shroud," (UNITYTactical) (Jun. 6, 2023) [online] <retrieved from URL:https://www.youtube.com/watch?v=cBwqLgWJtvY&t=37s >; [Video Screenshots], Retrieved on Feb. 21, 2025, 4 pages.

(Continued)

*Primary Examiner* — Bao-Thieu L Nguyen
(74) *Attorney, Agent, or Firm* — McLane Middleton, Professional Association

(57) ABSTRACT

In one aspect, a shroud assembly for headgear comprises a frame having a first side configured to face toward an exterior surface of the headgear and a second side opposite the first side and configured to face away from the headgear, the frame formed of a moldable material. An insert, which is configured for removable attachment to a helmet mount assembly, is coupled to the frame, wherein the frame is overmolded onto the insert. In further aspects, a helmet mounting system and method for the manufacture of a headgear shroud assembly are provided.

20 Claims, 13 Drawing Sheets

(56) References Cited

U.S. PATENT DOCUMENTS

| | | | |
|---|---|---|---|
| 11,229,252 B2 | 1/2022 | O'Connell | |
| 11,327,291 B2* | 5/2022 | Appel | G02B 23/125 |
| 11,330,857 B2 | 5/2022 | Teetzel et al. | |
| 11,382,375 B2 | 7/2022 | Noordzij et al. | |
| 11,419,382 B2 | 8/2022 | Teetzel et al. | |
| 11,606,997 B2 | 3/2023 | Teetzel et al. | |
| 11,609,417 B2* | 3/2023 | Appel | G02B 23/125 |
| 11,612,207 B2 | 3/2023 | Teetzel et al. | |
| 11,969,045 B2* | 4/2024 | Wall | A42B 3/042 |
| 12,059,048 B2* | 8/2024 | Teetzel | A42B 3/04 |
| D1,051,506 S | 11/2024 | Zimmer et al. | |
| 2010/0299814 A1* | 12/2010 | Celona | A42B 3/04 2/422 |
| 2011/0145981 A1* | 6/2011 | Teetzel | G02B 23/125 2/422 |
| 2012/0317706 A1* | 12/2012 | Lebel | A42B 3/04 2/422 |
| 2013/0086722 A1 | 4/2013 | Teetzel et al. | |
| 2014/0020159 A1 | 1/2014 | Teetzel et al. | |
| 2015/0026872 A1* | 1/2015 | Giroux Bernier | A42B 3/04 29/428 |
| 2015/0074878 A1* | 3/2015 | Teetzel | A42B 3/04 2/422 |
| 2016/0008640 A1 | 1/2016 | Teetzel | |
| 2017/0027264 A1* | 2/2017 | Giroux Bernier | A42B 3/04 |
| 2017/0049176 A1* | 2/2017 | Giroux Bernier | A42B 3/04 |
| 2019/0014846 A1 | 1/2019 | Teetzel et al. | |
| 2019/0098952 A1 | 4/2019 | Teetzel et al. | |
| 2019/0101359 A1 | 4/2019 | Zimmer | |
| 2019/0104797 A1 | 4/2019 | Teetzel et al. | |
| 2019/0107247 A1* | 4/2019 | Teetzel | F16B 47/003 |
| 2019/0208854 A1 | 7/2019 | Teetzel et al. | |
| 2020/0000167 A1* | 1/2020 | Noordzij | A42B 3/044 |
| 2020/0400934 A1* | 12/2020 | Appel | G02B 23/125 |
| 2021/0244122 A1 | 8/2021 | O'Connell | |
| 2021/0315314 A1 | 10/2021 | Teetzel et al. | |
| 2022/0197005 A1* | 6/2022 | Appel | G02B 23/125 |
| 2022/0202126 A1* | 6/2022 | Teetzel | A42B 3/04 |
| 2024/0156201 A1 | 5/2024 | Teetzel et al. | |
| 2024/0172829 A1* | 5/2024 | Zimmer | A42B 3/044 |

OTHER PUBLICATIONS

"Unity Tactical Launches Summit Three-Hole NVG Shroud," (FRAGOUT!) (Jun. 6, 2023) [online] <retrieved from URL:https://fragoutmag.com/unity-tactical-launches-summit-three-hole-nvg-shroud/>, retrieved on Feb. 21, 2025, 18 pages.

* cited by examiner

HEADGEAR SHROUD ASSEMBLY

CROSS REFERENCE TO RELATED APPLICATION

This application claims the priority benefit of U.S. provisional application No. 63/441,117 filed Jan. 25, 2023. The aforementioned application is incorporated herein by reference in its entirety.

INCORPORATION BY REFERENCE

This application is related to U.S. nonprovisional application Ser. No. 17/500,684, filed Oct. 13, 2021, now U.S. Patent Application Publication No. 2022/0202126; U.S. provisional application No. 63/092,140 filed Oct. 15, 2021; U.S. nonprovisional application Ser. No. 15/708,523 filed Sep. 19, 2017, now U.S. Pat. No. 10,264,840; U.S. nonprovisional application Ser. No. 14/483,471, filed Sep. 11, 2014, now U.S. Pat. No. 9,775,395; and U.S. provisional application No. 61/878,901 filed Sep. 17, 2013. Each of the aforementioned applications is incorporated herein by reference in its entirety.

BACKGROUND

The present invention relates to an improved shroud for mounting an accessory device to headgear. The shroud described herein may advantageously be used in connection with helmet mount assemblies for attaching night vision devices, thermal cameras, or other devices for enhancing vision in low light conditions and will be described herein primarily by way of reference thereto. However, it will be recognized that the shroud disclosed herein may be used with all manner of helmet or other headgear mounted accessories devices, including eye protection gear and others.

Night vision devices are used by military personnel, law enforcement personnel, and so forth when conducting military or tactical operations at night or under other low light conditions. Commonly, a helmet mount assembly is employed on the front of the user's headgear, such as a field helmet, to provide hands free support of the night vision device in front of the eyes of the user. Such helmet mount assemblies typically provide vertical, lateral, fore-and-aft, and tilt adjustment mechanisms for alignment of an attached night vision device with the eye or in the case of a binocular device eyes of the user. Helmet mount assemblies are known which allow the user to pivot the night vision device up to a stowed position out of the user's line of sight when not in use without removing the night vision device from the helmet.

Although mounting assemblies are known that allow the user to pivot the night vision device out of the way when the night vision device is not in use, it is often desirable to completely remove the night vision system and the helmet mount assembly from the headgear, e.g., during the daytime, in order to reduce helmet weight and strain on the user's neck, when entanglement hazards exist, etc. Commonly, helmet mount assemblies are made removably attachable to a helmet through the use of a mounting bracket or shroud, as described, for example, in commonly owned U.S. Pat. No. 7,219,370, which is incorporated herein by reference in its entirety. Such shrouds attach to the headgear with threaded fasteners using one or more holes drilled in the helmet. Standardized hole patterns have been developed, such as the Army-compatible single hole pattern and the MARSOC/WARCOM three-hole pattern. The use of standard hole patterns allow helmets to be pre-drilled to accept any shroud compatible with that hole pattern.

Commonly owned U.S. Pat. Nos. 9,775,395 and 10,264,840 and U.S. Patent Application Publication No. 2022/0202126 (each of which is incorporated herein by reference in its entirety), disclose two-piece headgear shroud assemblies comprising a polymer frame which receives an insert formed, e.g., of a metal or metal alloy. The polymer frame interfaces with a piece of headgear, such as a helmet, and the insert interfaces with a helmet mount assembly, which, in turn, supports a night vision device or other helmet-mounted accessory device. Threaded fasteners are utilized to provide a secure attachment between the frame and insert, which results in additional components and manufacturing steps.

The present disclosure contemplates a new and improved headgear shroud assembly that overcomes the above-referenced problems and others.

SUMMARY

In one aspect, a shroud assembly for headgear comprises a frame having a first side configured to face toward an exterior surface of the headgear and a second side opposite the first side and configured to face away from the headgear, the frame being formed of a moldable material. An insert, which is configured for removable attachment to a helmet mount assembly, is coupled to the frame, wherein the frame is overmolded onto the insert.

In a more limited aspect, the shroud assembly frame is formed of an injection moldable polymer material and the insert is formed of a metal or metal alloy.

In another more limited aspect, the first side of the frame has a shape which matches a surface contour of the headgear.

In another more limited aspect, the moldable material of the frame has a first mechanical feature which is interlocking with a second mechanical feature of the insert.

In another more limited aspect, the first mechanical feature comprises one or more tongues and the second mechanical feature comprises one or more grooves.

In another more limited aspect, the frame includes first and second spaced walls disposed on the second side of the frame on opposite sides of the insert. The first and second walls are spaced a sufficient distance apart to receive the helmet mount assembly therebetween.

In another more limited aspect, the shroud assembly further comprises any one or more of: the first and second walls extending vertically on opposite lateral sides of the insert; the first and second walls being sufficiently flexible so as to be displaced outward when the helmet mount assembly is removably attached to the shroud assembly; one or both of the first and second walls having a tapered inward facing surface to facilitate insertion of the helmet mount assembly between the first and second walls; and the insert defining one or more receptacles configured to removably mate with a latch member of the helmet mount assembly.

In another more limited aspect, the insert includes first and second spaced walls disposed on opposite lateral sides of the insert, the first and second walls spaced a sufficient distance apart to receive the helmet mount assembly therebetween.

In another more limited aspect, the frame is formed of a material selected from the group consisting of an injection moldable polymer resin and a fiber reinforced polymer matrix composite material.

In another more limited aspect, the frame comprises a polyimide material.

In another more limited aspect, the shroud assembly further comprises at least one opening in the frame configured to receive a mechanical fastener for attaching the shroud assembly to the headgear.

In another more limited aspect, the shroud assembly further comprises at least one opening in the insert configured to receive a mechanical fastener for attaching the shroud assembly to the headgear.

In another more limited aspect, the shroud assembly further comprises first, second, and third openings in the frame, each of the first, second, and third openings configured to receive a mechanical fastener for attaching the shroud assembly to the headgear.

In another more limited aspect, the first, second, and third openings are positioned in accordance with a promulgated standard for headgear drill hole patterns.

In another more limited aspect, the promulgated standard is a MARSOC/WARCOM three-hole pattern.

In another more limited aspect, the shroud assembly further comprises a backing pad removably attached to the second side of the frame. In embodiments, the backing pad is configured to increase friction between the shroud assembly and the headgear.

In a further aspect, a helmet mounting system comprises a shroud assembly, a helmet mount assembly, and an insert. The shroud assembly includes a frame having a first side configured to face toward an exterior surface of a helmet and a second side opposite the first side and configured to face away from the helmet. The frame is formed of a moldable material. The shroud assembly further includes an insert coupled to the frame, the insert configured for removable attachment to the helmet mount assembly, wherein the frame is overmolded onto the insert.

In yet a further aspect, a method for the manufacture of a headgear shroud assembly comprises providing an insert configured for removable coupling to a helmet mount assembly and overmolding a frame formed of a moldable material onto the insert.

In a more limited aspect, the overmolding step comprises positioning the insert within a mold and directing the moldable material into the mold and about the insert to form the frame from the moldable material.

In another more limited aspect, the step of directing the moldable material into the mold comprises injection molding.

In another more limited aspect, the injection molding step is selected from the group consisting of polymer injection molding, polymer composite injection molding, and metal injection molding.

In another more limited aspect, the insert comprises one or more first mechanical features interlocking with one or more second mechanical features formed of the moldable material.

Certain advantages and benefits of the present invention will become apparent to those of ordinary skill in the art upon reading and understanding the following Detailed Description of the Preferred Embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT(S)

Figure 1:
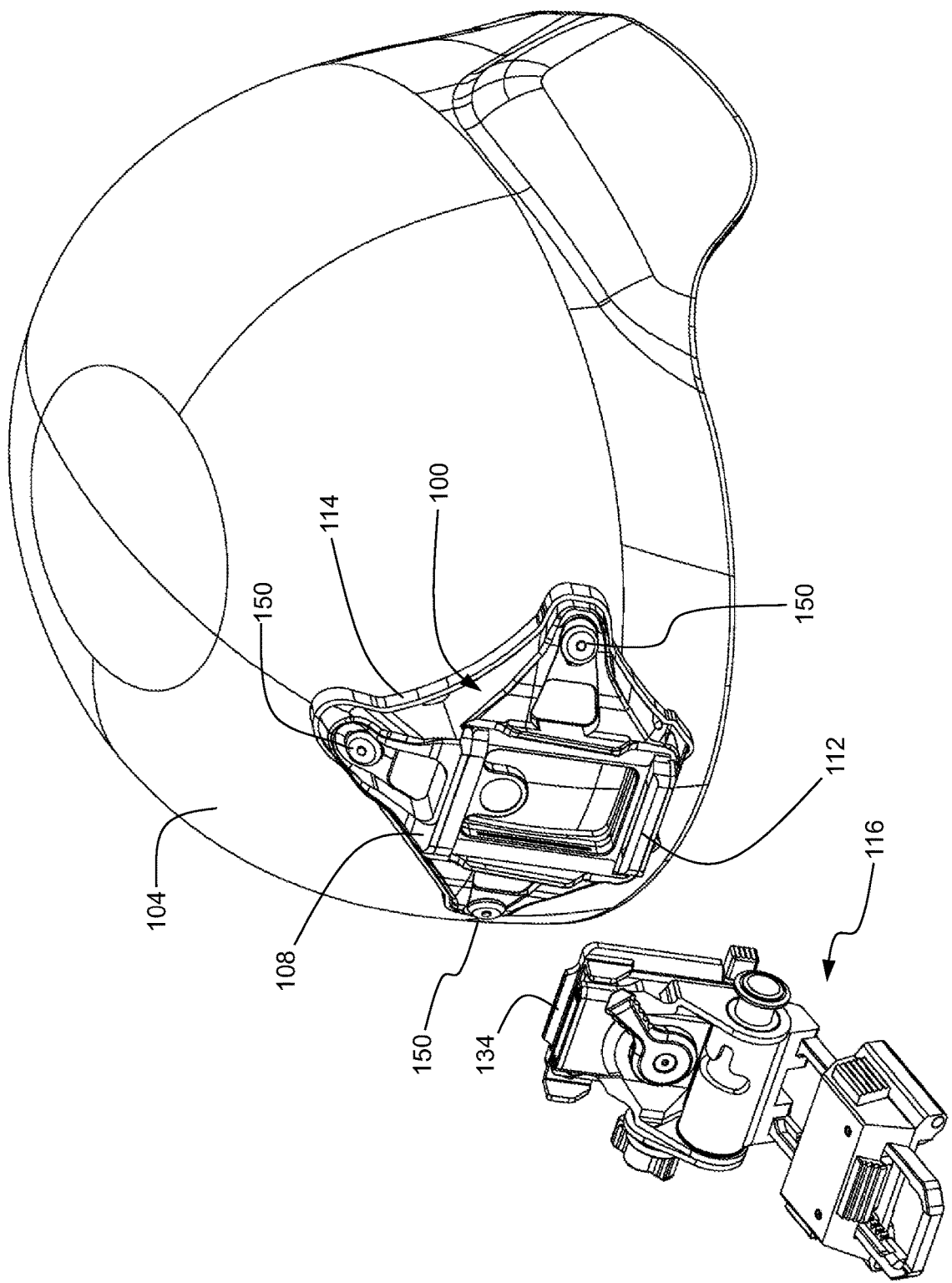
FIG. 1 is an isometric view of a shroud assembly according to a first exemplary embodiment attached to a helmet, the shroud assembly for detachably receiving a helmet mount assembly.
Figure 2:
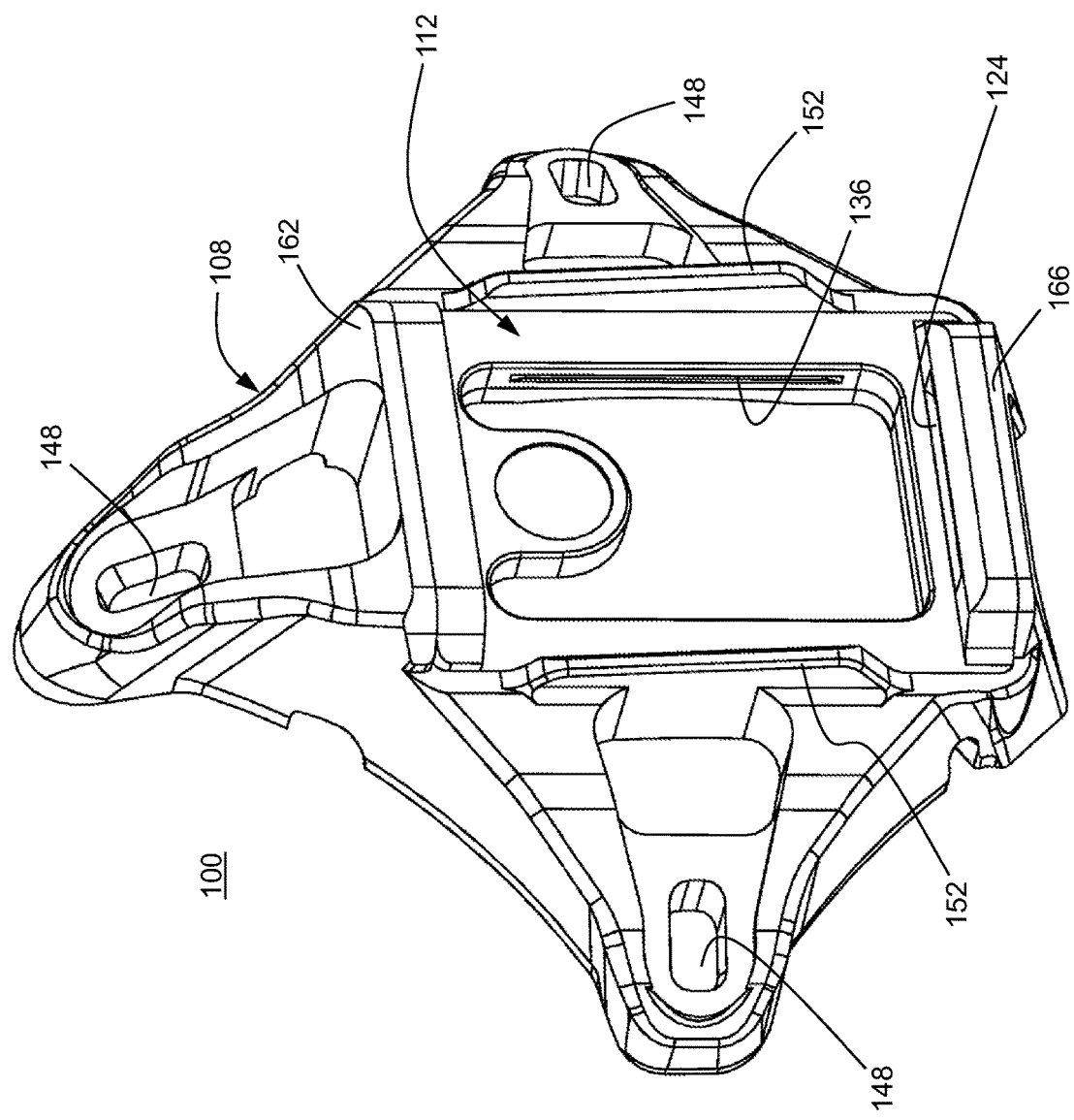
FIG. 2 is an enlarged isometric view of a headgear shroud assembly appearing in FIG. 1.
Figure 3:
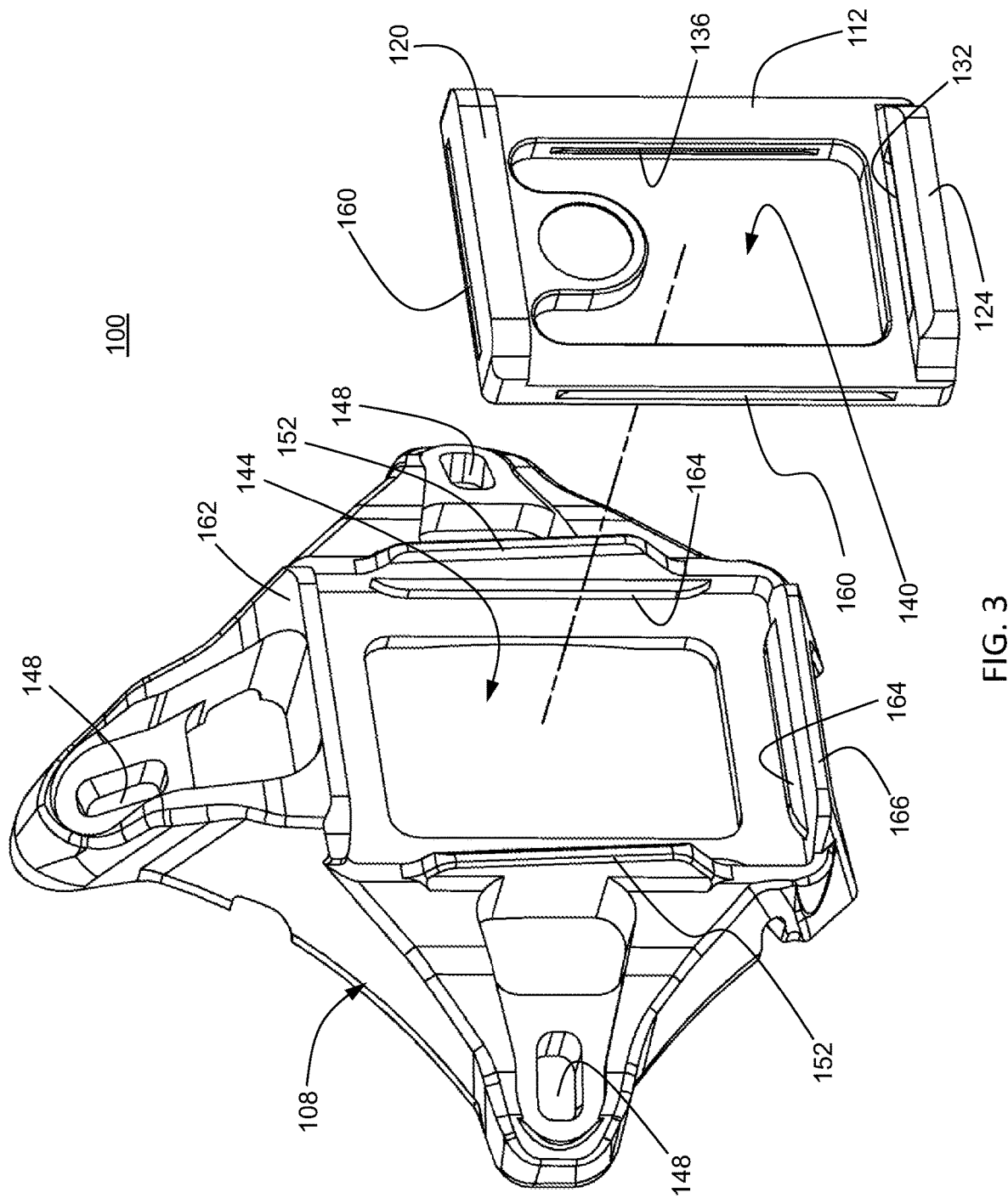
FIG. 3 is an exploded isometric view of the headgear shroud assembly appearing in FIG. 2.

Detailed embodiments of the present development are disclosed herein; however, it is to be understood that the disclosed embodiments are merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

The terms "upper," "lower," "lateral," "transverse," "bottom," "top," and the like are relative terms to provide additional clarity to the figure descriptions provided below. The terms "upper," "lower," "lateral," "transverse," "bottom," "top," and the like are thus not intended to unnecessarily limit the invention described herein.

Referring now to FIGS. 1-6, there appears an exemplary shroud assembly 100 in accordance with a first embodiment, which is configured to attach to the front of a helmet 104. The shroud assembly 100 includes a frame 108 formed of a moldable material which is overmolded about an insert 112. The insert 112 defines an interface for attaching a helmet mount assembly 116.

As used herein, the terms "overmold," "overmolded," etc., refer to a process wherein a single part is created using two or more different materials in combination. Commonly, a first material, sometimes referred to as the substrate, is partially or fully covered by one or more subsequent materials ("overmold materials") during a manufacturing process. The substrate can include a machined metal part, a metal injection molded, an additively manufactured metal or plastic part, a molded, machined, or additively manufactured plastic part, and so forth. The overmold material may be an injection moldable polymer composition. In a typical overmolding process, the substrate part is placed into an injection molding tool, at which point the overmold material is shot into, onto, or around the substrate. When the overmold material cures or solidifies, the two materials become joined together as a single part.

Figure 7:
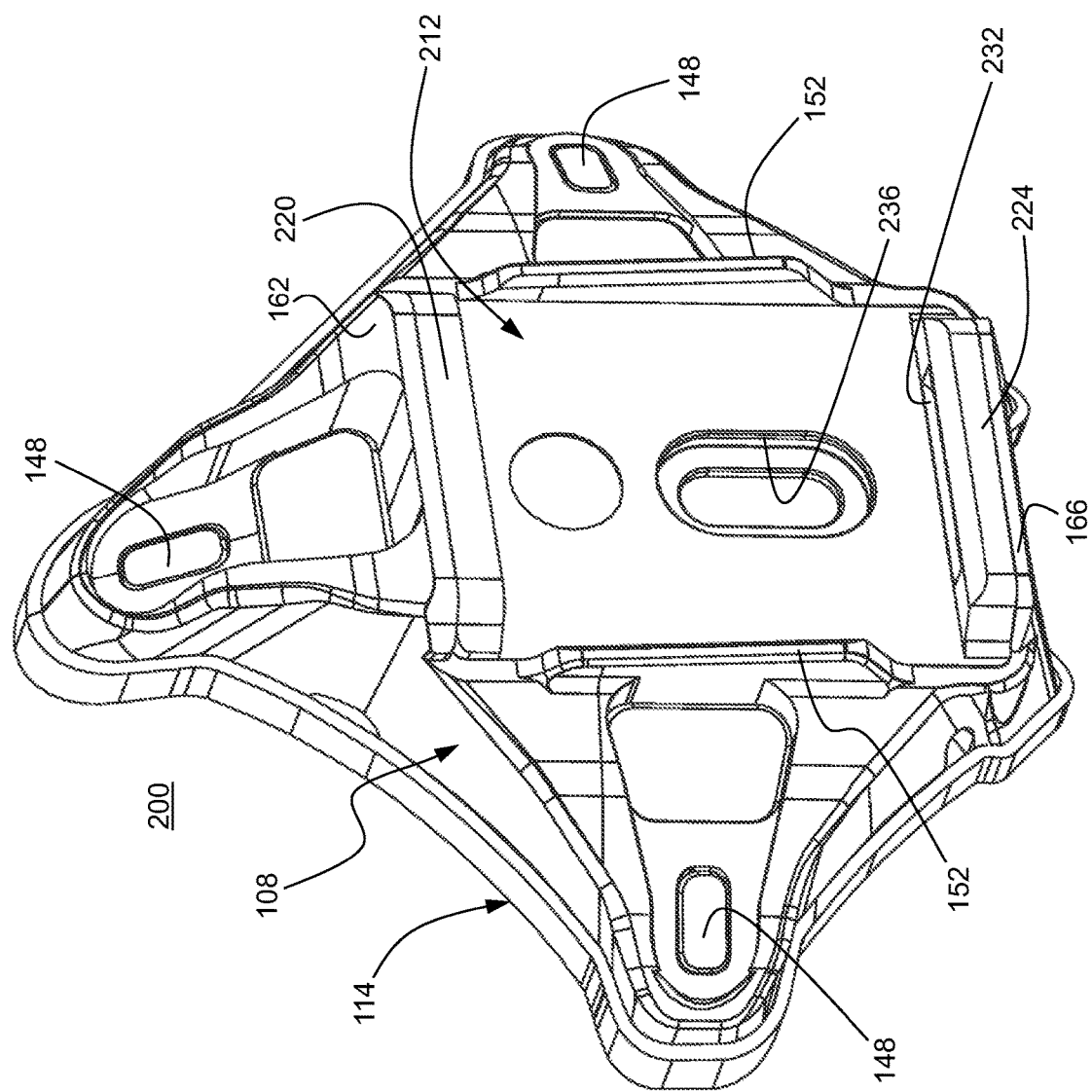
FIG. 7 is an isometric view of a headgear shroud assembly according to a second exemplary embodiment.
Figure 8:
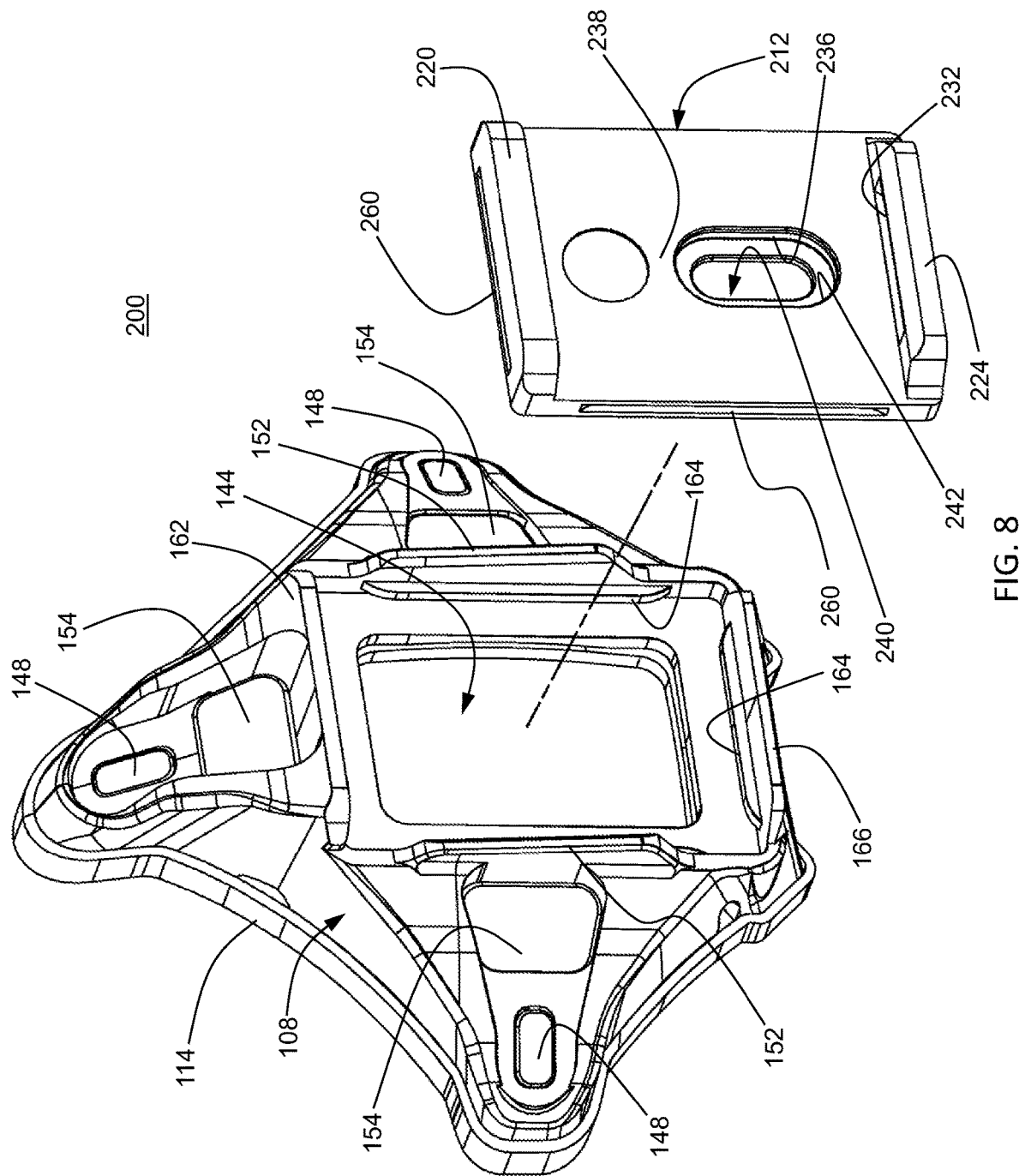
FIG. 8 is an exploded isometric view of the headgear shroud assembly appearing in FIG. 7.
Figure 9:
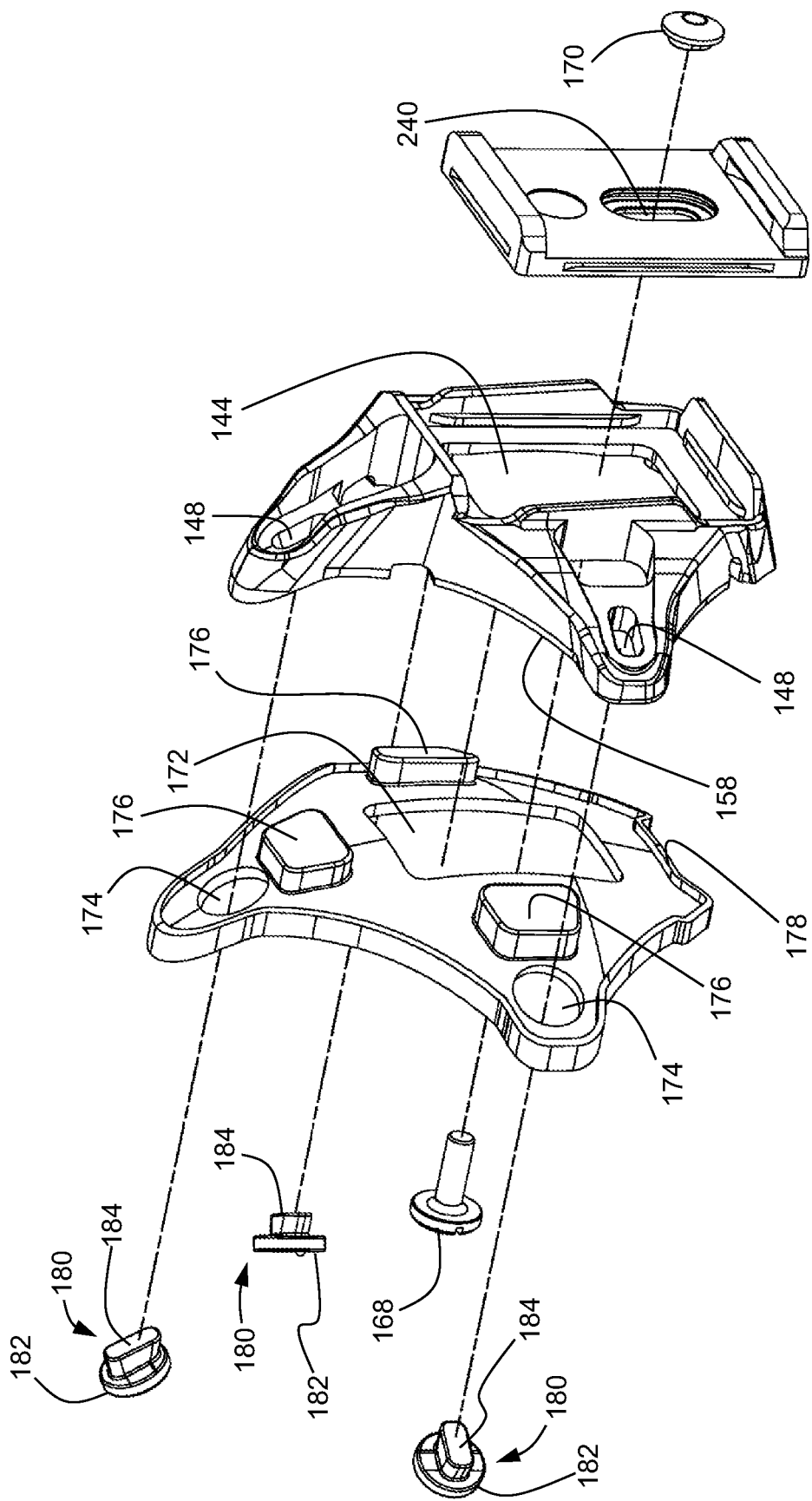
FIG. 9 is an exploded isometric view of the headgear shroud assembly appearing in FIG. 7 with an optional backing pad.

The illustrated shroud assembly 100 is configured for use in connection with a helmet 104 having holes drilled in a three-hole mounting pattern, such as the standard MARSOC/WARCOM three-hole pattern. It will be recognized, however, that the shroud assembly 100 could likewise be used with a helmet having the standard U.S. Army one-hole mounting pattern by utilizing an alternate insert having a central opening as illustrated in FIGS. 7-9, below.

The shroud assembly 100 provides an interface for the removable attachment of a helmet mount assembly 116, which may be as described in the aforementioned U.S. Pat. Nos. 9,775,395, 10,264,840, and U.S. Patent Application Publication No. 2022/0202126. In embodiments, the helmet mount assembly may be, for example, a helmet mount assembly in the L4 product line available from Wilcox Industries Corp. of Newington, NH. It will be recognized, however, that the present shroud assembly can be adapted for use with all manner of helmet mount assemblies by utilizing an insert 112 which has retention features complimentary with a desired helmet mount assembly. It will be recognized that the present shroud assembly is amenable for use with all manner of devices, including monocular devices, binocular devices, night vision systems, optical viewing devices, cameras, thermal cameras, head up displays, virtual and/or augmented reality goggles, other electronic or optoelectronic imaging devices, as well as eye shields, face shields, and other protective equipment.

Figure 4:
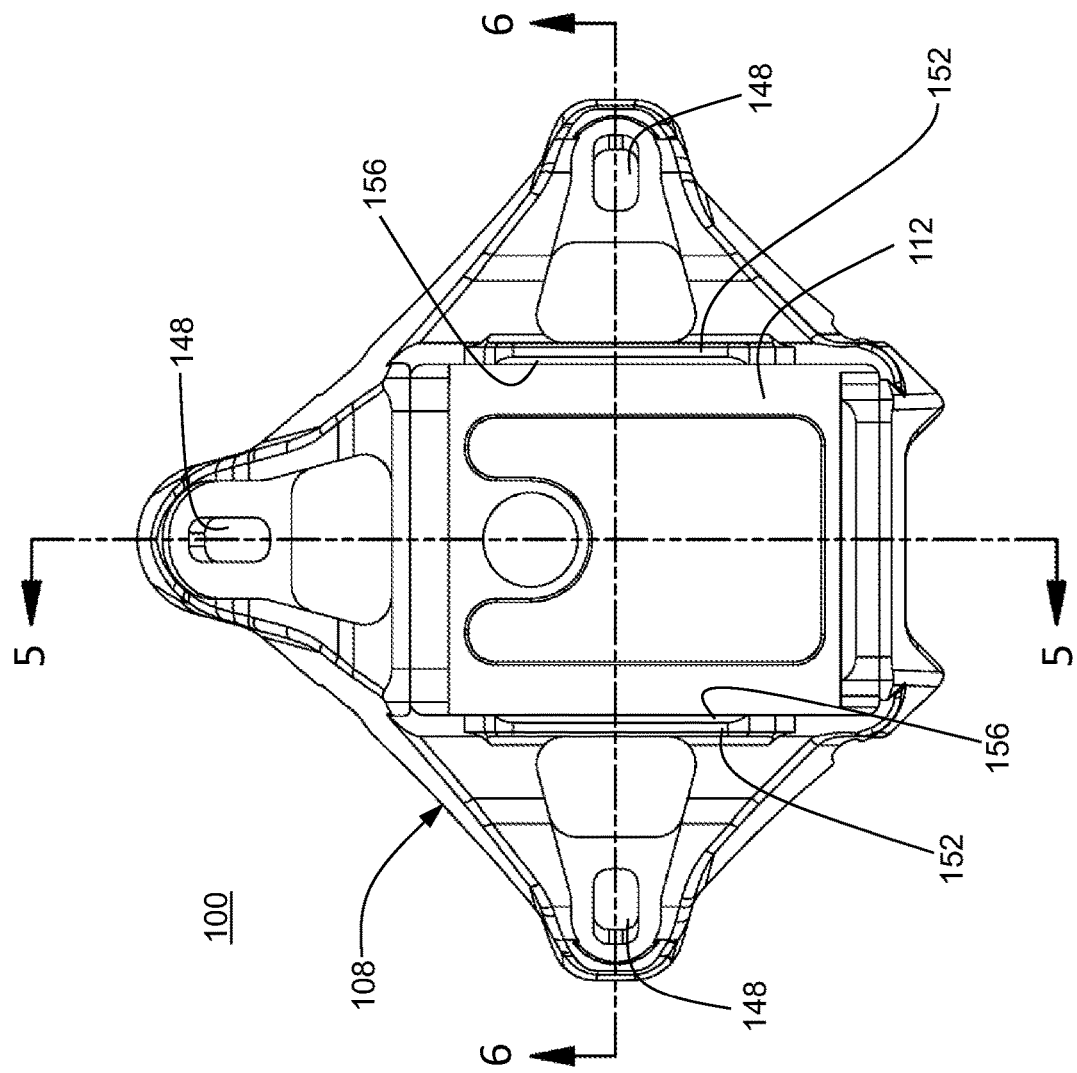
FIG. 4 is a front view of the headgear shroud assembly appearing in FIG. 2.
Figure 5:
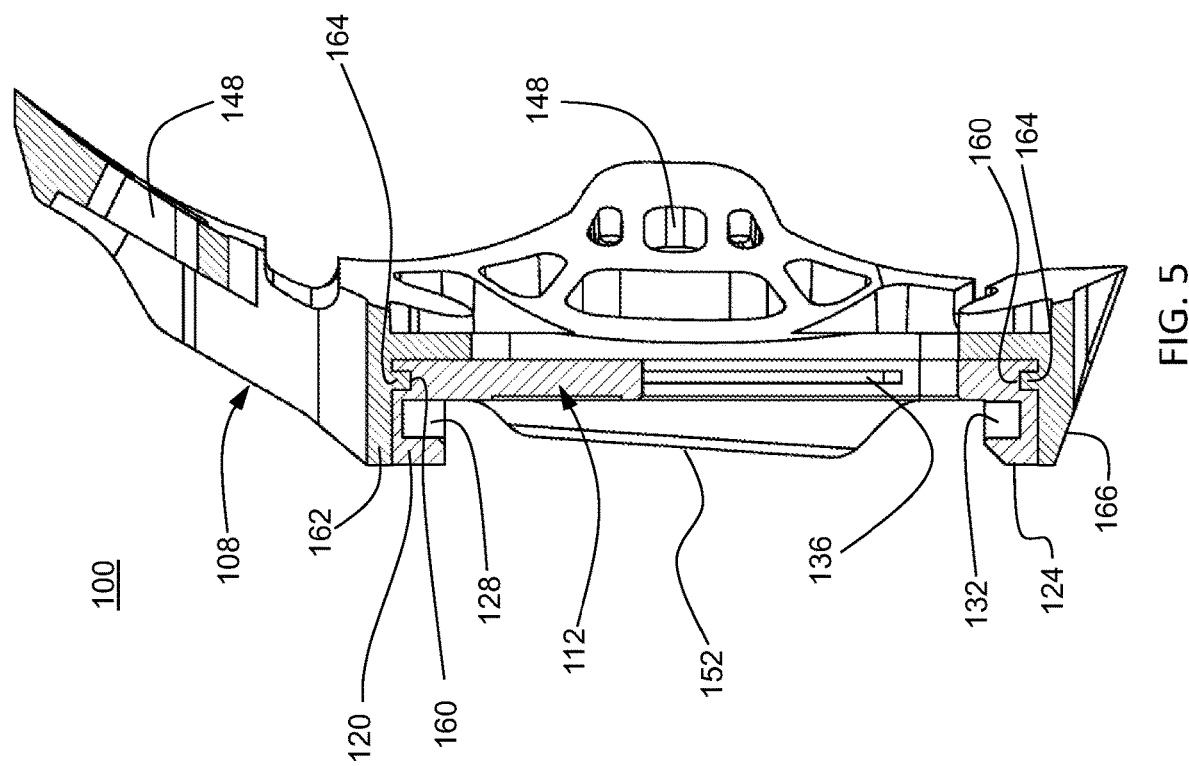
FIG. 5 is a cross-sectional view taken along the lines 5-5 appearing in FIG. 4.
Figure 6:
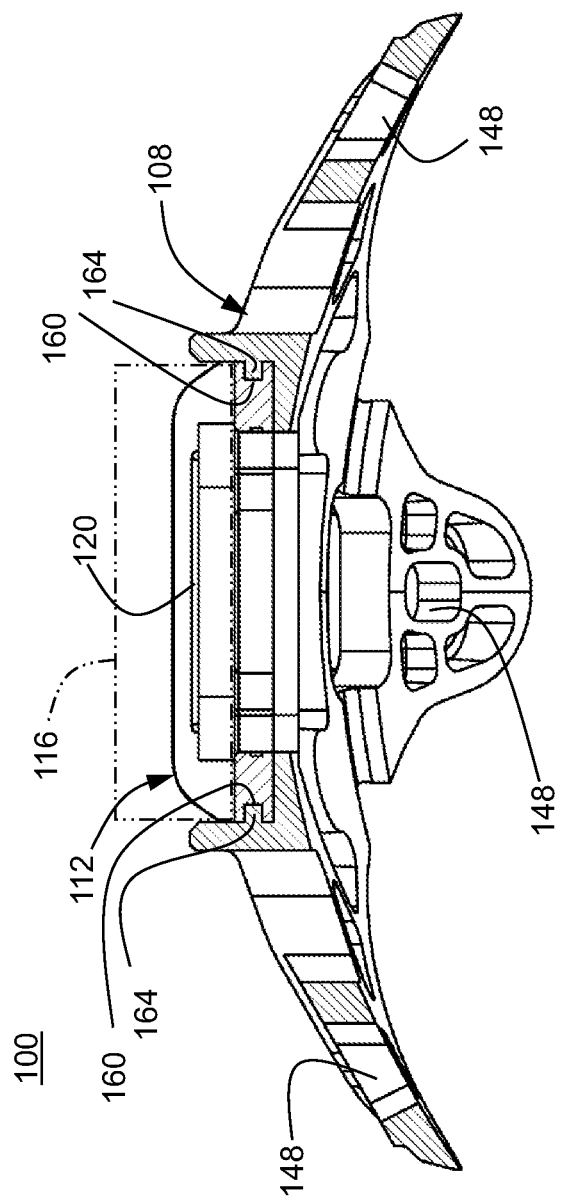
FIG. 6 is a cross-sectional view taken along the lines 6-6 appearing in FIG. 4.

In certain embodiments, the shroud assembly 100 may be used in conjunction with an optional backing pad or friction pad 114, e.g., formed of an elastomeric material, disposed between the rear surface of the shroud assembly 100 and the surface of the helmet 104, e.g., as described in the aforementioned U.S. Pat. Nos. 9,775,395 and 10,264,840 and U.S. Patent Application Publication No. 2022/0202126. In other embodiments, the shroud assembly 100 is attached directly to the helmet 104 surface without the backing pad 114. In embodiments, the backing pad 114 is as described in greater detail below. In embodiments, and as best seen in FIGS. 4 and 5, the rear surface of the shroud assembly 100 (and any associated backing pad 114, if any) has a generally concave rearward surface which is shaped to generally conform to a generally convex shape of the helmet 104.

The insert 112 is preferably formed by machining, although cast, molded, and additively manufactured inserts 112 are also contemplated. Exemplary metal/metal alloy materials suitable for forming the insert 112 include, titanium, aluminum, e.g., 6000 series aluminum or 7000 series aluminum, preferably 6061-T6 aluminum or 7075-T6 aluminum. In certain embodiments, the insert is formed by machining, molding, e.g., metal injection molding (MIM), casting, additive manufacturing, or the like. The insert 112 includes features for detachably engaging a helmet mount assembly 116.

In the illustrated embodiment, the insert 112 includes upper and lower transverse walls 120 and 124 bounding the upper and lowers ends, respectively, of the helmet mounting interface of the helmet mount assembly 116. Each of the upper and lower transverse walls 120 and 124 have a recess 128, 132, respectively, for removably engaging complementary latch members 134 on the helmet mount assembly 116. In certain embodiments, the helmet mount assembly 116 is of a type having upper and lower latch members 134 that detachably engage the recesses 128 and 132, respectively, wherein the upper and lower latch members 134 are configured to move or provide tension in the vertical direction to eliminate up and down movement of the helmet mount assembly 116 in relation to the shroud assembly 100.

In embodiments, the insert 112 includes one or more grooves or channels 136 which may be utilized for placement of the insert 112 in the mold and/or robotic positioning of the insert 112 during the overmolding process.

In the illustrated embodiment, the insert 112 has a large central opening 140, which is aligned with a large central opening 144 in the frame 108, and which is advantageous for reducing weight of the shroud assembly 100. However, it will be recognized that in alternative embodiments at least a portion of the center area may comprise material, e.g., where it is desired to provide a center mounting opening in the insert 112 for use with a helmet having a one hole mounting pattern, e.g., as described below.

The frame 108 is formed of a moldable material. In certain embodiments, the frame 108 is formed of an injection-moldable polymer composition. In certain embodiments, the frame 108 is formed of a fiber-reinforced polymer matrix composite material. Reinforcing fibers for polymer matrix composite materials are generally known. Exemplary fibers include carbonaceous fibers (e.g., carbon or graphite fibers), glass fibers, and other filamentary materials. Exemplary polymer overmold materials suitable for forming the frame 108 include, for example, nylon, polyamide, fiber reinforced polymer composite materials such as glass fiber-filled polyamides, polyetherimide (PEI), and polycarbonate (PC). In certain embodiments, the frame 108 is formed of a 30% glass filled polyimide composite material. All compositional percentages disclosed herein are by weight unless explicitly indicated otherwise.

The frame 108 is of a generally triangular construction and includes three openings 148 at the corners. Each opening 148 is configured to receive a threaded fastener 150 for securing the shroud assembly 100 to a helmet 104 having a three-hole pattern, e.g., a standard MARSOC/WARCOM three-hole pattern.

In certain embodiments, the frame 108 includes a pair of opposing walls or blades 152 extending from the front face of the overmolded frame member 108, disposed on opposing lateral sides of the overmolded insert member 112. In certain embodiments, the overmold material forming the frame 108 has a degree of flexibility or resilience to allow the blades to be spaced apart a distance that provides a snug fit, e.g., friction or interference fit, between the blades 152 and the sides of an attached helmet mount assembly 116. In this manner, side-to-side movement between the helmet mount assembly 116 and the shroud assembly 100 can be eliminated.

In the depicted preferred embodiment, the blades 152 include a tapered or angled surface 156 on the interior facing side thereof to facilitate insertion of the helmet mount assembly 116 and outward flexing of the blades 152.

In the illustrated embodiment, the blades 152 extend vertically and are disposed on opposite lateral sides of an attached helmet mount assembly 116. Other orientations of the blades 152, however, are also contemplated. For example, in the case of an alternative helmet mount assembly having latch members that move and provide tensioning in a horizontal direction to prevent side-to-side movement of the helmet mount assembly, the opposing blades 152 could be oriented horizontally and disposed above and below the helmet mount assembly to eliminate up and down movement of the helmet mount assembly.

In certain embodiments, the overmolded insert 112 and the overmolded frame 108 include interlocking mechanical features wherein the insert 112 and the overmolded frame 108 are interlocked to provide a permanent attachment. As used herein, "permanent attachment" means that the overmolded frame 108 and the insert 112 cannot be, or, are not intended to be, separated from each other without damaging the shroud assembly 100, frame 108, and/or insert 112. In contrast to shrouds having an insert secured to a frame with threaded fasteners, wherein the strength of the attachment between the insert and the frame is defined by the strength of the fasteners securing them together, the strength of attachment between the frame 108 and the insert 112 is defined by the overmolded interface between the frame 108 and the insert 112.

In embodiments, the insert 112 includes one or more trap grooves or channels which are filled with the overmold material during the overmolding process to form complementary interlocking structures on the frame portion 108. In the illustrated embodiment, the insert 112 includes upper and lower trap grooves 160 formed on the upper and lower peripheral edges of the insert 112, and left and right trap grooves 160 formed on the left and right side peripheral edges of the insert 112. The frame 108 includes upper and lower ledges 162 and 166, respectively, having elongate upper and lower tongue members 164 formed of the overmold materials and which interlock with the respective upper and lower grooves 160. The frame 108 further includes elongate left and right tongue members 164 formed of the overmold materials and which interlock with the respective left and right grooves 160. It will be recognized that other configurations for interlocking the frame 108 and insert 112 in a mechanical capacity are also contemplated. For example, the trap grooves 160 on the insert 112 could be replaced with tongues, ribs, or like protrusions which engage complementary grooves or like complementary recesses formed during the overmolding process.

Referring now to FIGS. 7-9, a second embodiment shroud assembly 200 comprises a frame 108 overmolded as described above onto an insert 212. The shroud assembly 200 is illustrated with the optional backing pad 114. The shroud assembly 200 is primarily intended for use in connection with a helmet having a single mounting hole, such as the standard U.S. Army one-hole mounting pattern, and will be described primarily by way of reference thereto. It will be recognized, however, that the shroud assembly 200 could likewise be used, with or without the backing pad 114, with a helmet having holes drilled in a three hole mounting pattern, such as the standard MARSOC/WARCOM three-hole pattern, in the same manner as detailed above in connection with the shroud assembly 100 appearing in FIGS. 1-6.

The shroud assembly 200 provides an interface for the removable attachment of a helmet mount assembly as described above, such as a night vision mounting system.

The frame 108 and the backing pad 114 each have a generally concave rearward surface which is shaped to generally conform to the shape of the helmet 104. The frame 108 is formed of an overmold material as described above. The insert 212 is formed from a material and manufacturing method as described above by way of reference to the insert 112.

The backing pad 114 may be formed of natural or synthetic rubber or other elastomer material. In embodiments, the backing pad 114 increases the friction between the shroud assembly 200 and the helmet 104 and is particularly advantageous for use with a helmet 104 having a one-hole pattern to prevent rotation of the unit 200 about fasteners 168, 170 which secure the shroud assembly 200 to the helmet 104.

The insert 212 includes a central portion 238 having an opening 240 for receiving the threaded fastener 168. The opening 240 may be elongated in the vertical direction to provide vertical adjustability when mounting the shroud assembly 200, e.g., to accommodate differences between the drilled hole placement on the helmet, accommodate edge trim on the brim of the helmet, and so forth.

The threaded fastener 168 passes through a hole (not shown) in the helmet 104, a large central opening 172 in the backing pad 114, the large central opening 144 in the frame 108, and the hole 240 in the insert 212. The fastener 168 is secured via a complementary threaded fastener or nut 170 received in a counterbore 242 about the opening 240. The backing pad 114 is disposed on the inward facing (i.e., helmet facing) side of the shroud assembly 200.

A pair of walls or blades 152 extends from the face of the frame 108 immediately adjacent the central opening 144 on opposite lateral sides thereof. In certain embodiments, the blades 152 include a tapered or angled surface 156 on the interior facing side thereof to facilitate insertion of the mounting system 116. In embodiments where the frame 108 is formed of a sufficiently flexible material, outward flexing of the blades 152 is also facilitated by the tapered or angled surface.

The depicted preferred embodiment illustrates an exemplary shroud assembly 200 adapted for use with a mounting assembly 116 that has latch members 134 that move or provide tension in the vertical direction, such that the blades 152 are disposed on opposite lateral sides of an attached mounting assembly. Other orientations of the blades 152, however, are also contemplated. For example, in the case of a helmet mount assembly 116 having latch members that move and provide tensioning in a horizontal direction, the opposing blades 152 could be oriented horizontally above and below the mounting assembly interfacing portion to eliminate up and down movement.

The backing pad 114 is shaped to receive the frame 108 on the outward facing surface of the backing pad 114 in a stacked or nested arrangement. The pad 114 includes three openings 174 aligned with the openings 148 at the corners of the frame 108. The pad 114 further includes three bosses or protrusions 176, which are disposed intermediate the central opening 172 and the openings 174. When the frame 212 and the backing pad 114 are stacked in the assembled, nested configuration, the bosses 176 extend through aligned openings 154 in the frame 108, to interlock the frame 108 and the pad 114 together.

The pad 114 may include an upstanding peripheral lip or ridge 178 on the forward facing surface thereof complementary in shape and sized to receive the peripheral edge 158 of the frame 108. The frame 108 and pad 114 are further secured via three plugs 180 at the corners of the unit 200. Each plug 180 includes a base 182 which is received in one of the openings 174 in the pad 114. Each plug 180 further includes a protrusion 184 that extends through a corresponding one of the openings 148 in the frame 108.

In alternative embodiments, the plugs 180 can be omitted, as well as the central helmet fasteners 170, 172, wherein the unit 200 is secured to a helmet having a three-hole pattern, as described above. In certain embodiments, the helmet drill/hole pattern may advantageously be the standard MARSOC/WARCOM three-hole pattern. It will be recognized that the shroud assembly 200 could also be attached to a helmet (either with or without the backing pad 114) using both the central hole 240 via the fasteners 168, 170, as well as three threaded fasteners 150 (see FIG. 1) using the openings 148; however, in general, it is preferable to use only the one hole pattern or the three hole pattern, since unnecessary holes drilled into the helmet can compromise the ballistic integrity of the helmet.

Figure 10:
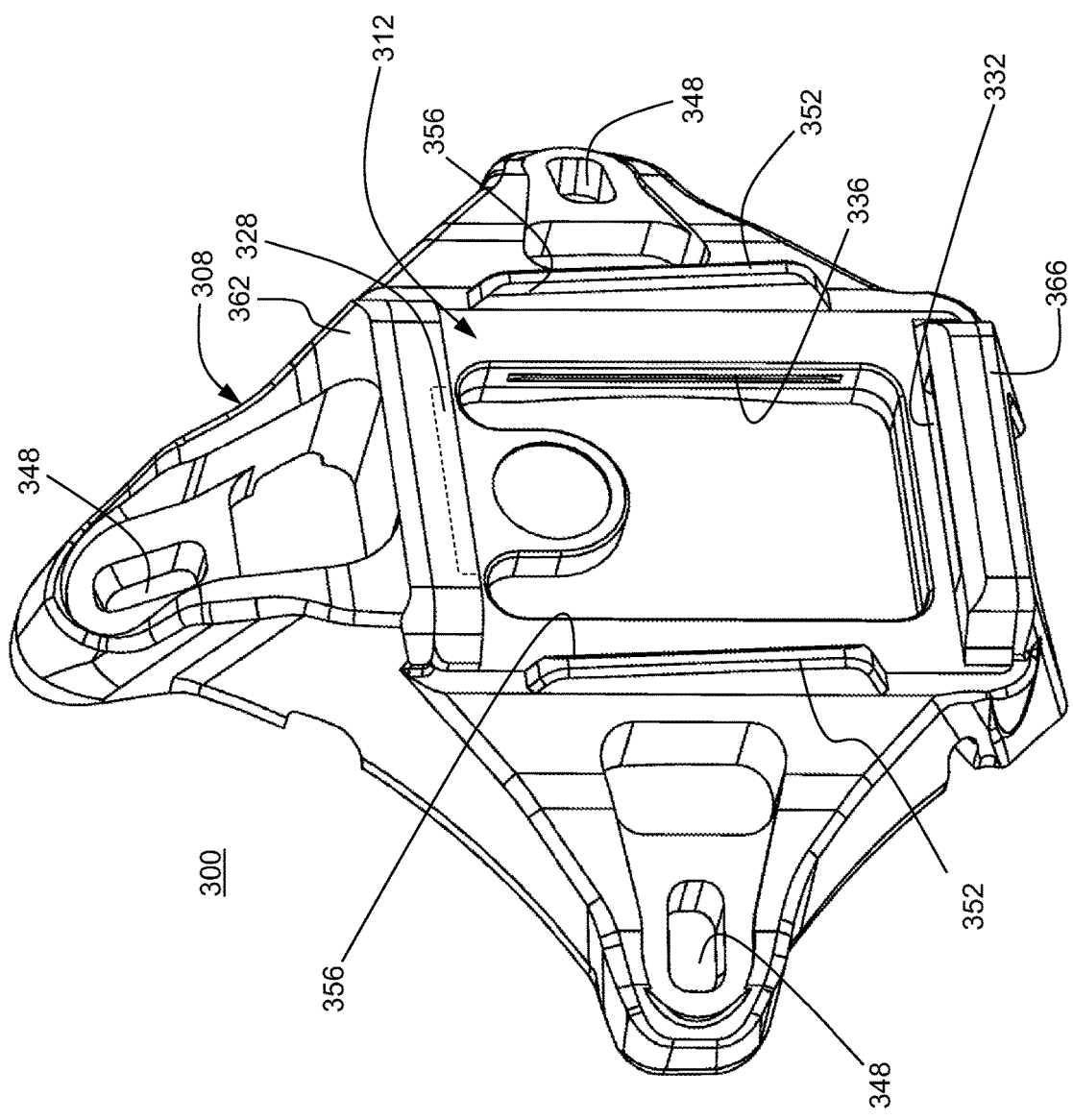
FIG. 10 is an isometric view of a headgear shroud assembly according to a third exemplary embodiment.
Figure 11:
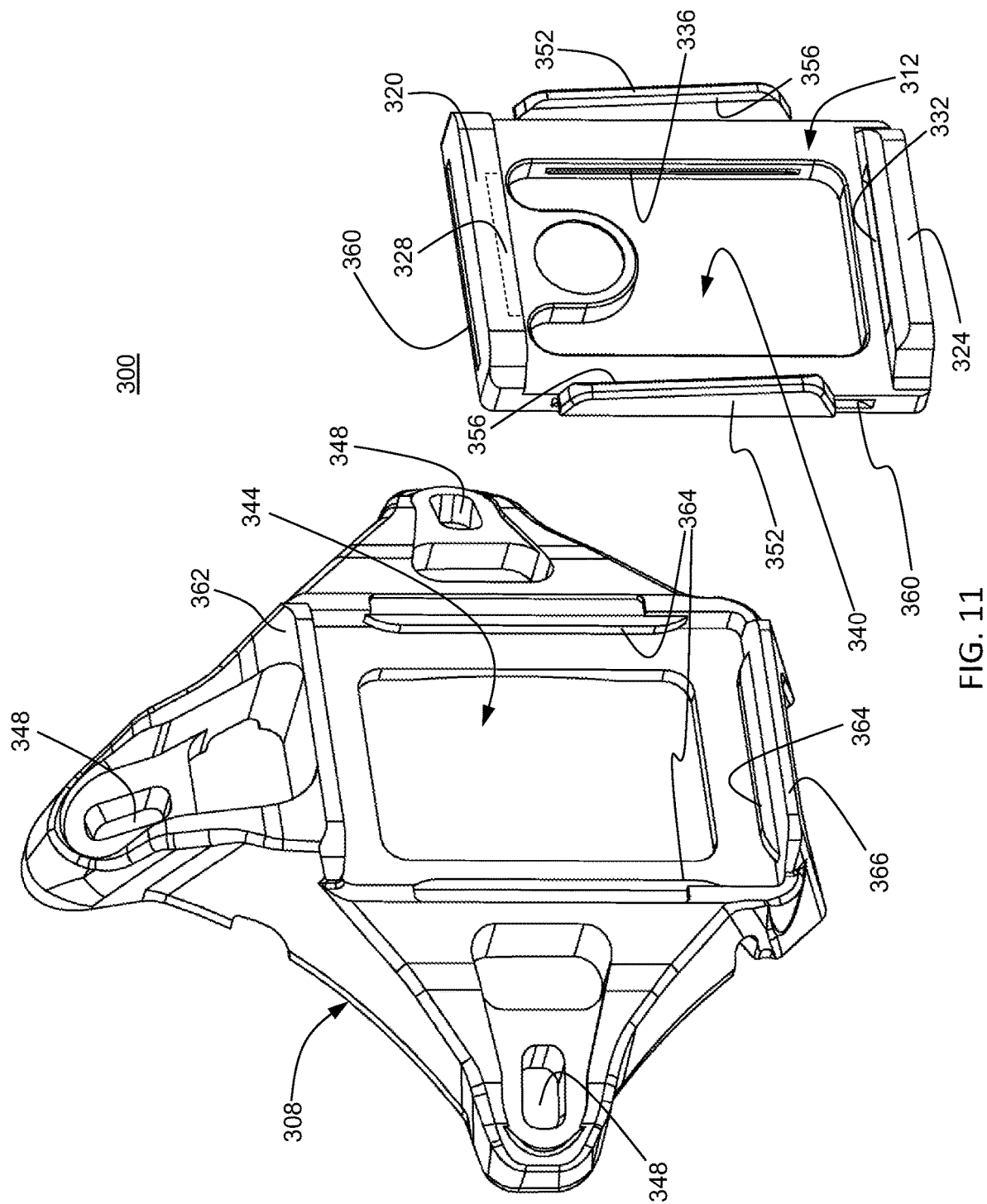
FIG. 11 is an exploded isometric view of the headgear shroud assembly appearing in FIG. 10.

Referring now to FIGS. 10 and 11, there appears an exemplary shroud assembly 300 in accordance with a third embodiment, which is configured to attach to the front of a helmet 104 (see FIG. 1). The shroud assembly 300 includes a frame 308 formed of a moldable material as described above and which is overmolded about an insert 312, as described above. The insert 312 defines an interface for attaching a helmet mount assembly 116 (see FIG. 1), and may be formed of a material and via method as described above.

Figure 12:
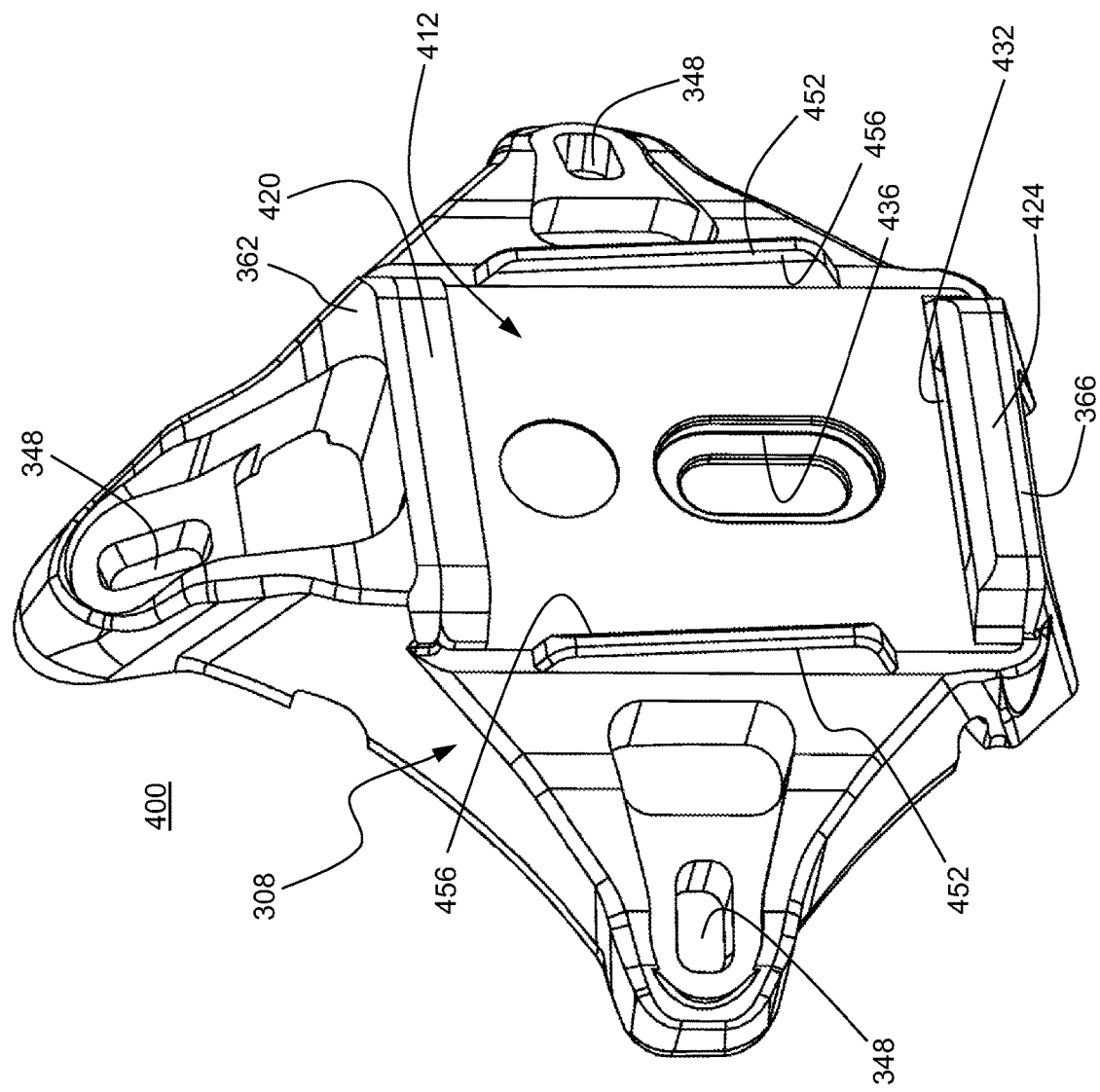
FIG. 12 is an isometric view of a headgear shroud assembly according to a fourth exemplary embodiment.
Figure 13:
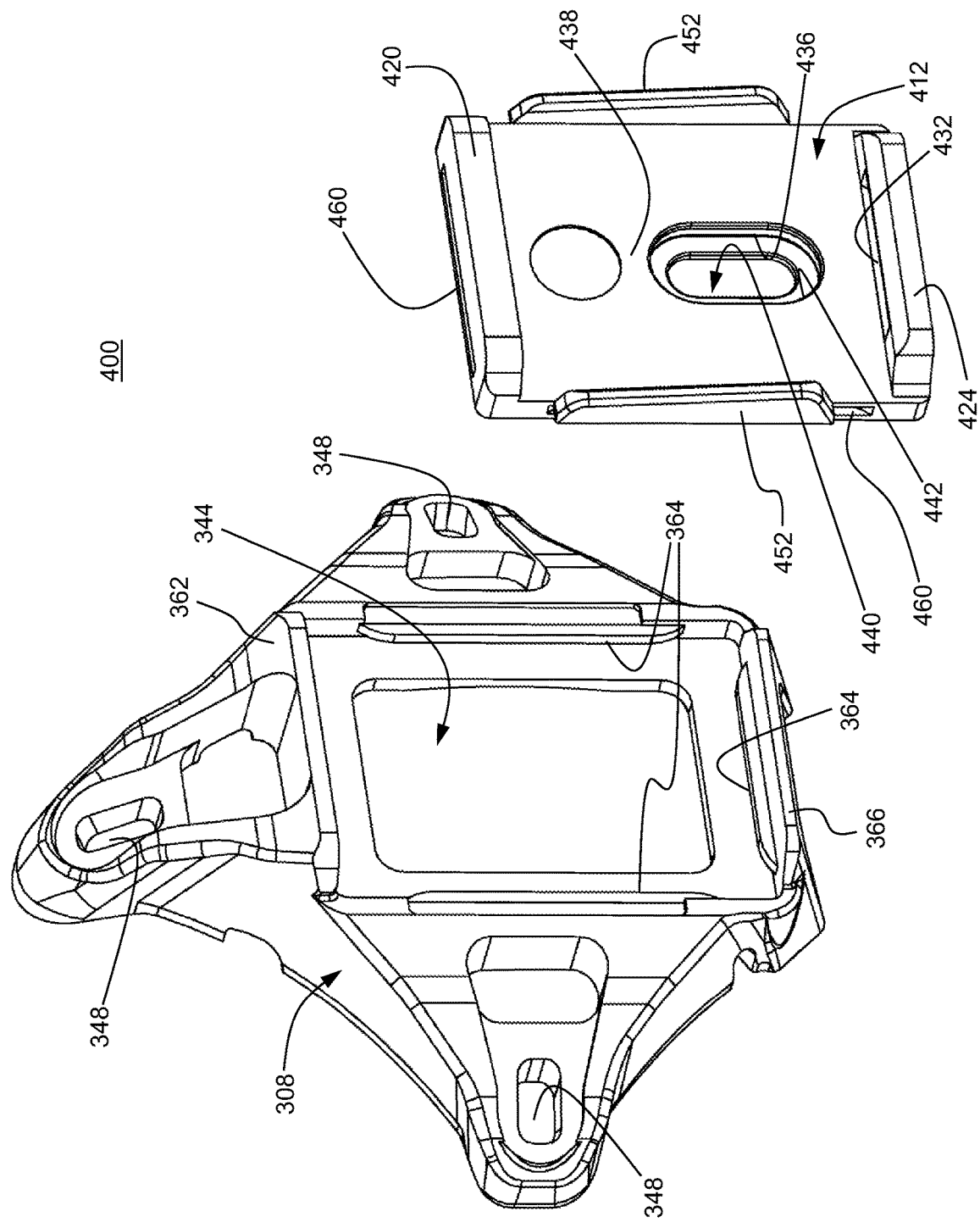
FIG. 13 is an exploded isometric view of the headgear shroud assembly appearing in FIG. 11.

The illustrated shroud assembly 300 is configured for use in connection with a helmet 104 having holes drilled in a three-hole mounting pattern, such as the standard MARSOC/WARCOM three-hole pattern. It will be recognized, however, that the shroud assembly 300 could likewise be adapted for use with a helmet having the standard U.S. Army one-hole mounting pattern by utilizing an alternate insert having a central opening as illustrated in FIGS. 12 and 13, below.

In certain embodiments, the shroud assembly 300 may be used in conjunction with an optional backing pad or friction pad 114 formed of an elastomeric material disposed between the rear surface of the shroud assembly 300 and the surface of the helmet 104, as described above. In other embodiments, the shroud assembly 300 is attached directly to the helmet 104 surface without the backing pad 114. In embodiments, the rear surface of the shroud assembly 300 (and any associated backing pad 114, if any) has a generally concave rearward surface which is shaped to generally conform to a generally convex shape of the helmet 104.

In the illustrated embodiment, the insert 312 includes upper and lower transverse walls 320 and 324 bounding the upper and lowers ends, respectively, of the helmet mounting interface of the helmet mount assembly 116. Each of the upper and lower transverse walls 320 and 324 have a recess 328, 132, respectively, for removably engaging complementary latch members 134 on the helmet mount assembly 116 (see FIG. 1).

In embodiments, the insert 312 includes one or more grooves or channels 336 which may be utilized for placement of the insert 312 in the mold and/or robotic positioning of the insert 312 during the overmolding process.

In the illustrated embodiment, the insert 312 has a large central opening 340, which is aligned with a large central opening 344 in the frame 308, and which is advantageous for reducing weight of the shroud assembly 300. However, it will be recognized that in alternative embodiments at least a portion of the center area may comprise material, e.g., where it is desired to provide a center mounting opening in the insert for use with a helmet having a one hole mounting pattern, e.g., as described below.

The frame 308 is of a generally triangular construction and includes three openings 348 at the corners. Each opening 348 is configured to receive a threaded fastener 150 (see FIG. 1) for securing the shroud assembly 300 to a helmet 104 having a three-hole pattern, e.g., a standard MARSOC/WARCOM three-hole pattern.

In certain embodiments, the overmolded insert 312 and the overmolded frame 308 include interlocking mechanical features wherein the insert 312 and the overmolded frame 308 are interlocked to provide a permanent attachment. In embodiments, the insert 312 includes one or more trap grooves or channels which are filled with the overmold material during the overmolding process to form complementary interlocking structures on the frame portion 308. In the illustrated embodiment, the insert 312 includes upper and lower trap grooves 360 formed on the upper and lower peripheral edges of the insert 112, and left and right trap grooves 360 formed on the left and right side peripheral edges of the insert 312. The frame 308 includes upper and lower ledges 362 and 366, respectively, having elongate upper and lower tongue members 364 formed of the overmold materials and which interlock with the respective upper and lower grooves 360. The frame 308 further includes upper and lower ledges 362 and 366, respectively, having elongate left and right tongue members 364 formed of the overmold materials and which interlock with the respective left and right grooves 160. It will be recognized that other configurations for interlocking the frame 308 and insert 312 in a mechanical capacity are also contemplated. For example, the trap grooves 360 on the insert 312 could be replaced with tongues, ribs, or like protrusions which engage complementary grooves or like complementary recesses formed during the overmolding process.

In certain embodiments, the insert 312 includes a pair of opposing walls or blades 352 extending from the front face of the insert member 308, disposed on opposing lateral sides of the interface for receiving the helmet mount assembly 116, e.g., to assist in locating the helmet mount assembly and preventing side-to-side movement between the helmet mount assembly 116 and an attached shroud assembly 300.

In the depicted preferred embodiment, the blades 352 include a tapered or angled surface 356 on the interior facing side thereof to facilitate insertion of the helmet mount assembly 116 onto the interface portion of the shroud assembly 300.

In the illustrated embodiment, the blades 352 extend vertically and are disposed on opposite lateral sides of an attached helmet mount assembly 116. Other orientations of the blades 352, however, are also contemplated. For example, in the case of an alternative helmet mount assembly having latch members that move and provide tensioning in a horizontal direction to prevent side-to-side movement of the helmet mount assembly, the opposing blades 352 could be oriented horizontally and disposed above and below the helmet mount assembly to eliminate up and down movement of the helmet mount assembly.

Referring now to FIGS. 12 and 13, a fourth embodiment shroud assembly 400 comprises a frame 308 overmolded as described above onto an insert 412. The shroud assembly 400 is advantageously used with the optional backing pad 114 (see FIGS. 7-9). The shroud assembly 400 is primarily intended for use in connection with a helmet having a single mounting hole, such as the standard U.S. Army one-hole mounting pattern, and will be described primarily by way of reference thereto. It will be recognized, however, that the shroud assembly 400 could likewise be used, with or without the backing pad 114, with a helmet having holes drilled in a three hole mounting pattern, such as the standard MARSOC/WARCOM three-hole pattern, in the same manner as detailed above in connection with the shroud assembly 100.

The shroud assembly 400 provides an interface for the removable attachment of a helmet mount assembly as described above, such as a night vision mounting system.

The frame 308 and optional backing pad 114 if present each have a generally concave rearward surface which is shaped to generally conform to the shape of the helmet 104. The frame 308 is formed of an overmold material as described above. The insert 412 is formed from a material and manufacturing method as described above. The frame 308 is as otherwise described above.

The insert 412 includes a central portion 438 having an opening 440 for receiving the threaded fastener 168 (see FIG. 9). The opening 440 may be elongated in the vertical direction to provide vertical adjustability when mounting the shroud assembly 400, e.g., to accommodate differences between the drilled hole placement on the helmet, accommodate edge trim on the brim of the helmet, and so forth. Fastening of the shroud assembly 400 to the helmet 104 may be as described above by way of reference to FIGS. 7-9.

In the depicted preferred embodiment, the blades 452 include a tapered or angled surface 456 on the interior facing side thereof to facilitate insertion of the helmet mount assembly 116 onto the interface portion of the shroud assembly 300.

In the illustrated embodiment, the blades 452 extend vertically and are disposed on opposite lateral sides of an attached helmet mount assembly 116. Other orientations of the blades 452, however, are also contemplated. For example, in the case of an alternative helmet mount assembly having latch members that move and provide tensioning in a horizontal direction to prevent side-to-side movement of the helmet mount assembly, the opposing blades 452 could be oriented horizontally and disposed above and below the helmet mount assembly to eliminate up and down movement of the helmet mount assembly.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A shroud assembly for headgear, comprising:
a frame having a first side configured to face toward an exterior surface of the headgear and a second side opposite the first side and configured to face away from the headgear, the frame formed of a moldable material; and
an insert coupled to the frame, the insert defining a complementary interface configured to detachably mate with a helmet mount assembly, wherein the frame is overmolded onto the insert;
wherein the moldable material of the frame forms a first mechanical feature which is interlocking with a second mechanical feature of the insert.

2. The shroud assembly of claim 1, wherein the frame is formed of an injection moldable polymer material and the insert is formed of a metal or metal alloy.

3. The shroud assembly of claim 1, wherein the first side of the frame has a shape which matches a surface contour of the headgear.

4. The shroud assembly of claim 1, wherein the first mechanical feature comprises one or more tongues and the second mechanical feature comprises one or more grooves.

5. The shroud assembly of claim 1, wherein the frame includes first and second spaced walls disposed on the second side of the frame on opposite sides of the insert, said first and second walls spaced a sufficient distance apart to receive the helmet mount assembly therebetween.

6. The shroud assembly of claim 5, further comprising any one or more of:
the first and second walls extend vertically on opposite lateral sides of the insert;
the first and second walls are sufficiently flexible so as to be displaced outward when the helmet mount assembly is removably attached to the shroud assembly;
one or both of the first and second walls have a tapered inward facing surface to facilitate insertion of the helmet mount assembly between the first and second walls; and
the insert defining one or more receptacles configured to removably mate with a latch member of the helmet mount assembly.

7. The shroud assembly of claim 1, wherein the insert includes first and second spaced walls disposed on opposite lateral sides of the insert, said first and second walls spaced a sufficient distance apart to receive the helmet mount assembly therebetween.

8. The shroud assembly of claim 1, wherein the frame is formed of a material selected from the group consisting of:
an injection moldable polymer resin; and
a fiber reinforced polymer matrix composite material.

9. The shroud assembly of claim 8, wherein the frame comprises a polyimide material.

10. The shroud assembly of claim 1, further comprising one or both of:
at least one opening in the frame configured to receive a mechanical fastener for attaching the shroud assembly to the headgear; and
at least one opening in the insert configured to receive a mechanical fastener for attaching the shroud assembly to the headgear.

11. The shroud assembly of claim 1, further comprising:
first, second, and third openings in the frame, each of the first, second, and third openings configured to receive a mechanical fastener for attaching the shroud assembly to the headgear.

12. The shroud assembly of claim 11, wherein the first, second, and third openings are positioned in accordance with a promulgated standard for headgear drill hole patterns.

13. The shroud assembly of claim 12, wherein the promulgated standard is selected from the group consisting of a Marine Forces Special Operations Command (MARSOC) three-hole pattern and a Naval Special Warfare Command (WARCOM) three-hole pattern.

14. The shroud assembly of claim 1, further comprising a backing pad removably attached to the second side of the frame.

15. A helmet mounting system comprising:
a shroud assembly comprising a frame having a first side configured to face toward an exterior surface of a helmet and a second side opposite the first side and configured to face away from the helmet, the frame formed of a moldable material;
a helmet mount assembly; and
an insert coupled to the frame, the insert defining a complementary interface configured to detachably mate with the helmet mount assembly, wherein the frame is overmolded onto the insert, wherein the moldable material of the frame forms a first mechanical feature which is interlocking with a second mechanical feature of the insert.

16. A method for the manufacture of a headgear shroud assembly, comprising:

providing an insert defining a complementary interface configured to detachably mate with a helmet mount assembly;

overmolding a frame formed of a moldable material onto the insert;

wherein the insert comprises one or more first mechanical features interlocking with one or more second mechanical features on the frame formed of the moldable material.

17. The method of claim 16, wherein said overmolding comprises:

positioning the insert within a mold; and directing the moldable material into the mold and about the insert to form the frame from the moldable material.

18. The method of claim 17, wherein said directing the moldable material into the mold comprises injection molding.

19. The method of claim 18, wherein said injection molding is selected from the group consisting of polymer injection molding, polymer composite injection molding, and metal injection molding.

20. The method of claim 16, wherein the one or more first mechanical features comprises one or more tongues and the one or more second mechanical features comprises one or more grooves.

* * * * *